United States Patent
Rajakarunanayake (10) Patent No.: US 10,285,065 B2
(45) Date of Patent: May 7, 2019

(54) LONG-RANGE LOW-POWER INTEGRATED WIRELESS TRANSMISSION IN CHANNEL GAPS AND GUARD SPECTRUM

(71) Applicant: MediaTek Inc., Hsinchu (TW)

(72) Inventor: Yasantha Rajakarunanayake, San Ramon, CA (US)

(73) Assignee: MediaTek Inc., Hsinchu (TW)

( * ) Notice: Subject to any disclaimer, the term of this patent is extended or adjusted under 35 U.S.C. 154(b) by 169 days.

(21) Appl. No.: 15/415,834

(22) Filed: Jan. 25, 2017

(65) Prior Publication Data
US 2017/0135110 A1   May 11, 2017

Related U.S. Application Data

(60) Provisional application No. 62/287,486, filed on Jan. 27, 2016.

(51) Int. Cl.
*H04W 16/14* (2009.01)
*H04L 27/26* (2006.01)
*H04W 56/00* (2009.01)
*H04W 84/12* (2009.01)

(52) U.S. Cl.
CPC ......... *H04W 16/14* (2013.01); *H04L 27/2601* (2013.01); *H04W 56/001* (2013.01); *H04W 84/12* (2013.01)

(58) Field of Classification Search
CPC ............. H04L 27/2601; H04W 16/14; H04W 56/001; H04W 84/12; H04W 28/20; H04W 72/0453
See application file for complete search history.

(56) References Cited

U.S. PATENT DOCUMENTS

| 2007/0053414 | A1* | 3/2007 | Payne | H04B 1/525 375/141 |
| 2010/0329384 | A1* | 12/2010 | Kwak | H04L 5/0007 375/295 |
| 2013/0286937 | A1* | 10/2013 | Liu | H04W 48/16 370/328 |
| 2014/0313995 | A1* | 10/2014 | Cyranka | H04W 16/14 370/329 |
| 2016/0374080 | A1* | 12/2016 | Wei | H04W 74/0833 |
| 2017/0094621 | A1* | 3/2017 | Xu | H04W 56/001 |

FOREIGN PATENT DOCUMENTS

WO   WO-0203717 A2 *   1/2002   ............ H04W 16/14

* cited by examiner

*Primary Examiner* — Rina C Pancholi
(74) *Attorney, Agent, or Firm* — Han IP PLLC; Andy M. Han (57) ABSTRACT

Methods and apparatuses pertaining to long-range low-power integrated wireless transmission in channel gaps and guard spectrum are described. A method may involve facilitating wideband wireless communications in a plurality of wideband channels in a frequency spectrum with every two adjacent wideband channels of the plurality of wideband channels separated by a respective channel gap therebetween. The method may also involve facilitating narrowband wireless communications, while facilitating the wideband wireless communications, in a plurality of narrowband channels that are multiplexed in the channel gaps, guard bands at both ends of the frequency spectrum, or both.

17 Claims, 7 Drawing Sheets

LONG-RANGE LOW-POWER INTEGRATED WIRELESS TRANSMISSION IN CHANNEL GAPS AND GUARD SPECTRUM

CROSS REFERENCE TO RELATED PATENT APPLICATIONS

The present disclosure claims the priority benefit of U.S. Patent Application No. 62/287,486, filed on 27 Jan. 2016, which is incorporated by reference in its entirety.

TECHNICAL FIELD

The present disclosure is generally related to wireless communications and, more particularly, to long-range low-power (LRLP) integrated wireless transmission in channel gaps and guard spectrum.

BACKGROUND

Unless otherwise indicated herein, approaches described in this section are not prior art to the claims listed below and are not admitted to be prior art by inclusion in this section.

The "Internet of Things" (IoT) generally refers to the internetworking of physical devices, objects, structures and items (herein collectively referred as "IoT devices"). Among various types of IoT devices, there is a class of IoT devices (e.g., battery powered and/or grid powered) that utilize low power and low bandwidth for communication (e.g., wireless communication) with one or more other IoT devices and/or one or more networks. Within a given physical area or space, a group of IoT devices may constitute one or more basic service sets (BSS) associated with one or more wireless local area networks (WLANs) in accordance with the Institute of Electrical and Electronics Engineers (IEEE) 802.11 specifications. When there are multiple BSS's of IoT devices, BSS overlap may exist and, consequently, interference with one or more frequency bands of interest may exist. Thus, for long-range low-power communications across multiple BSS's, challenges exist at least in terms of interference avoidance and finding available spectrum.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose a novel scheme that addresses space and frequency usage where spatial domains of multiple BSS's overlap. The proposed scheme also aims to allow for non-interfering communications in frequency/channel gaps. Moreover, the proposed scheme aims to allow less restricted inter-BSS operations in the time domain (e.g., by multiplexing in the frequency domain). In other words, the proposed scheme provides an intelligent way of multiplexing for the IoT devices to share space, frequency and time domains with non-interfering communications.

In one aspect, a method may involve facilitating wideband wireless communications in a plurality of wideband channels in a frequency spectrum with every two adjacent wideband channels of the plurality of wideband channels separated by a respective channel gap therebetween. The method may also involve facilitating narrowband wireless communications, while facilitating the wideband wireless communications, in a plurality of narrowband channels that are multiplexed in the channel gaps, guard bands at both ends of the frequency spectrum, or both.

In another aspect, a method may involve facilitating wideband wireless communications in at least one wideband channel in a frequency spectrum. The method may also involve facilitating narrowband wireless communications, without interfering the wideband wireless communications, in one or more narrowband channels in the frequency spectrum.

In another aspect, an apparatus may include a communication device and a processor operatively coupled to the communication device. The communication device may be capable of transmitting and receiving wireless signals. The processor may be capable of facilitating, via the communication device, wideband wireless communications in at least one wideband channel with guard tones in a frequency spectrum. The processor may be also capable of facilitating, via the communication device, narrowband wireless communications, while facilitating the wideband wireless communications, in one or more narrowband channels on either or both sides of the at least one wideband channel in the frequency spectrum.

BRIEF DESCRIPTION OF THE DRAWINGS

The accompanying drawings are included to provide a further understanding of the disclosure, and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Under the proposed scheme, long-range low-power (LRLP) communications using a narrowband and frequency multiplexing in accordance with the present disclosure may coexist with short-range wideband communications such as Wi-Fi, carrier sense multiple access with collision avoidance (CSMA/CA) and orthogonal frequency-division multiplexing (OFDM)-based communications, with independent non-interfering access for the narrowband as well as independent non-interfering access for the wideband. That is, the proposed scheme may be applicable to all OFDM-based communication systems that utilize frequency space guard bands. Under the proposed scheme, narrowband LRLP communications take place in the guard bands and/or in gaps between adjacent wideband channels, thus avoiding interference. This novel concept allows LRLP signals to traverse long distances in narrowband, e.g., across multiple BSS's, and solves hidden node issues.

In various implementations in accordance with the present disclosure, the APs of plural WLANs in a given geographic area or neighborhood may coordinate and allow narrowband transmissions (e.g., 2-MHz wireless transmissions) across multiple BSSs/WLANs and over long distances. Under the proposed scheme, wireless communication devices such as, for example and without limitations, IoT devices, smartphones, wearable devices, laptop computers, tablet computers and the like may communicate in narrowband channels while the APs may be capable of operating in both legacy or wideband mode (e.g., with 20-MHz channels) (hereinafter interchangeably referred as the "normal BSS mode" or "wideband mode") and the LRLP or narrowband mode (e.g., with 2-MHz channels) (hereinafter interchangeably referred as the "LRLP mode" or "narrowband mode").

Under the proposed scheme, LRLP-supporting devices may co-exist with legacy or wideband devices. LRLP-supporting devices may be generally categorized into two types: LRLP gateways and LRLP devices. LRLP gateways may be devices that can function as an IEEE 802.11 stations (STAs) as well as a LRLP-supporting AP. It is noteworthy that it is not necessary for a LRLP gateway to have full AP capabilities for the sake of deployment of LRLP service in accordance with the present disclosure. From the perspective of MAC layer communications, LRLP gateways may be regarded as repeater devices of a WLAN, and are capable of intelligently filtering traffic in and out of a given LRLP domain to standard BSS. A unified BSS may assign security as well as capabilities of upper-layer IP address and layer 2 (L2) bridging and proxy. One advantage of having LRLP gateway with legacy or wideband STAs is that the hidden node problem can be mitigated better, as the STAs can protect in their own vicinity (like CTS) and more locations are accessible.

Figure 1:
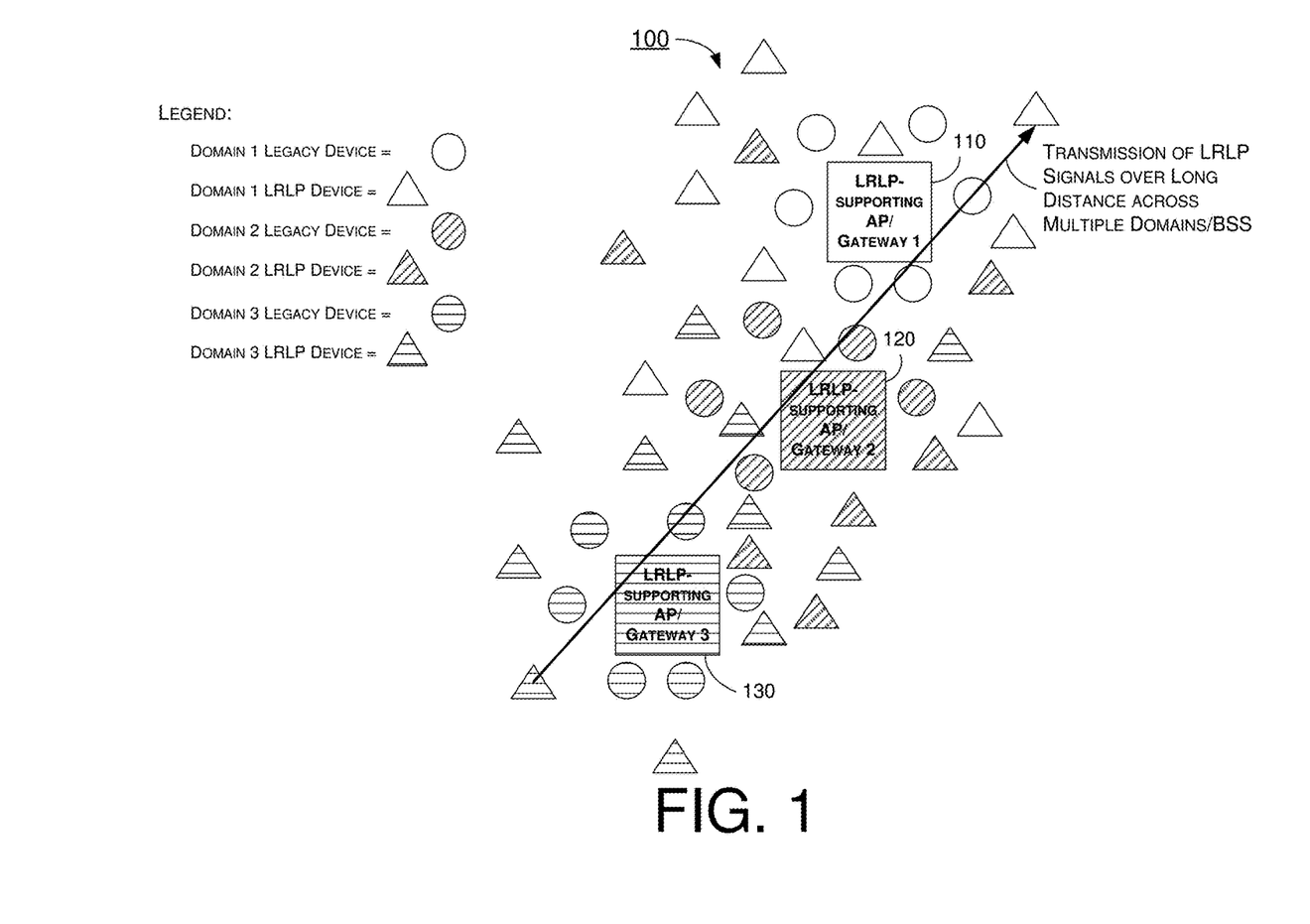
FIG. 1 is a diagram of an example scenario depicting the basic concept of the proposed scheme of the present disclosure.

FIG. 1 illustrates an example scenario 100 depicting the basic concept of the proposed scheme of the present disclosure. In scenario 100, there are a number of LRLP-capable or otherwise LRLP-supporting gateways (labeled with numeral references "110", "120" and "130" in FIG. 1), each functioning as an access point for its respective domain—namely, "domain 1", "domain 2" and "domain 3", respectively. That is, each of LRLP-supporting gateways 110, 120 and 130 functions as an access point, gateway and/or master for a respective number of wireless devices in its respective domain.

As shown in FIG. 1, each of the domains has a number of legacy or wideband devices (or, non-LRLP devices) as well as a number of LRLP devices. The LRLP devices may include, for example and without limitation, any number of IoT devices, smartphones, wearable devices, laptop computers, tablet computers or the like. While the legacy devices may communicate wirelessly over wideband channels, the LRLP devices may, without interfering the wideband communications, communicate wirelessly over narrowband channels in gaps and guard bands between the wideband channels as well as at a lower end and/or an upper end of a frequency spectrum for the wireless wideband communications. Thus, each of LRLP-supporting gateways 110, 120 and 130 may facilitate wideband wireless communications in a plurality of wideband channels in the frequency spectrum with every two adjacent wideband channels of the plurality of wideband channels separated by a respective channel gap therebetween. Moreover, each of LRLP-supporting gateways 110, 120 and 130 may also facilitate narrowband wireless communications, while facilitating the wideband wireless communications, in a plurality of narrowband channels that are multiplexed in the channel gaps, guard bands at both ends of the frequency spectrum, or both. Accordingly, the proposed scheme enables the sharing of space, frequency and time as well as intelligent multiplexing. That is, the usage of space and frequency where spatial domains of multiple BSSs overlap is addressed by the proposed scheme.

An example implementation of the proposed scheme is in the 2.4 GHz or 5 GHz band for WLAN applications, although the proposed scheme, disclosed embodiments and variations thereof may be utilized in applications other than the 2.4 GHz, 5 GHz and/or WLAN. Under the proposed scheme, each 20-MHz channel may have guard bands at the top and bottom of the communication bands (e.g., about 2 MHz), and LRLP transmission may occur in such bands as well as gaps between adjacent wideband channels after BSS stations (STA) and listening devices have been notified in advance of the LRLP transmission. Legacy devices may be least impacted as LRLP signals tend to peak in channel gaps between adjacent 20-MHz channels. A simple LRLP preamble may be utilized, and such preamble may be detected in the gaps by the BSS to set network allocation vector (NAV) for the transmission window (the window of time during which the LRLP transmission occurs). A new physical layer (PHY) preamble (transmitted in the narrowband in the gaps/guard bands) and a signal (SIG) field with duration may inform and bound quiet time.

In the context of 2.4-GHz WLAN, LRLP communications in accordance with the present disclosure may be achieved over distances greater than that of traditional 2.4-GHz communications such as 300 meters, while operating in the 2.4-GHz spectrum with minimal or otherwise low impact on legacy Wi-Fi devices. Thus, the proposed scheme allows LRLP communications to be fully integrated with in-band protection and collision avoidance of media access control (MAC) in compliance with the IEEE 802.11 specifications. As a result, implementations in accordance with the proposed scheme can utilize available spectrum very efficiently (e.g., OFDM narrowband channels) as opposed to single carrier, and can be achieved with low power consumption (e.g., efficient bandwidth packing compared to Bluetooth and Bluetooth Low Energy (BLE) spectral mask). Moreover, upper layer operations and Internet Protocol (IP) v4 and v6 may be executed in a seamless manner similar to Wi-Fi and controlled by a common access point (AP) which may support both a LRLP mode and a legacy mode.

In the narrowband, the operating physical layer (PHY) may resemble a clocked-down version of Wi-Fi or a variation of IEEE 802.11ah. The PHY may also be similar to uplink (UL) orthogonal frequency-division multiple access (OFDMA) resource unit (RU) discussed in the IEEE 801.11ax specification. Regardless of the PHY/MAC used or designated, the proposed scheme allows for managing narrowband frequencies, allocations and selection of PHY/MAC for operation. When a given AP/STA device uses joint hardware in receiving (RX)/transmission (TX) for legacy and LRLP communications, the 20-MHz BSS may switch into a quiet period and observe back-offs.

Under the proposed scheme, in the LRLP mode, devices may be scanned for frequencies and may operate and join a LRLP-supporting BSS. Operations with respect to authentication, authorization, association and encryption may be handled in a manner similar to wideband BSS at 20 MHz. Power control may be important to decrease and/or increase the range as well as to increase/decrease power consumption and battery lifetime.

Under the proposed scheme, as the LRLP BSS extend over a longer range over multiple sizes of the 20-MHz BSS, AP coordination information may be passed in the LRLP channels so that an over-the-air AP synchronization and coordination may be achieved for improved efficiency. For instance, each of LRLP-supporting gateways 110, 120 and 130 may be capable of communicating with one another to transmit and receive AP coordination information in one or more narrowband channels. Moreover, each of LRLP-supporting gateways 110, 120 and 130 may be capable of synchronizing with one another using the AP coordination information.

Under the proposed scheme, there may be a number of modes for LRLP operation. For instance, there may be a scheduled non-emergency mode which may be contention-based CSMA/CA. There may also be a scheduled mode in time domain where LRLP AP/STA may be allowed to access air-interface based on scheduled MAC. There may further be a LRLP mode that acts as a frequency duplex which sends energy at both upper and lower ends of the frequency spectrum. This may allow LRLP detection by multiple intermediate BSSs and service such requests. This may also provide robustness against interference. In some implementations, the usage of LRLP communications in the gaps and guard bands may allow access to emergency devices such as fire alarms. In such cases, there is no need to wait for wideband (e.g., 20 MHz) BSS to finish transmission to send emergency payloads in narrowband LRLP channel(s) in the gaps and/or guard bands.

Figure 2:
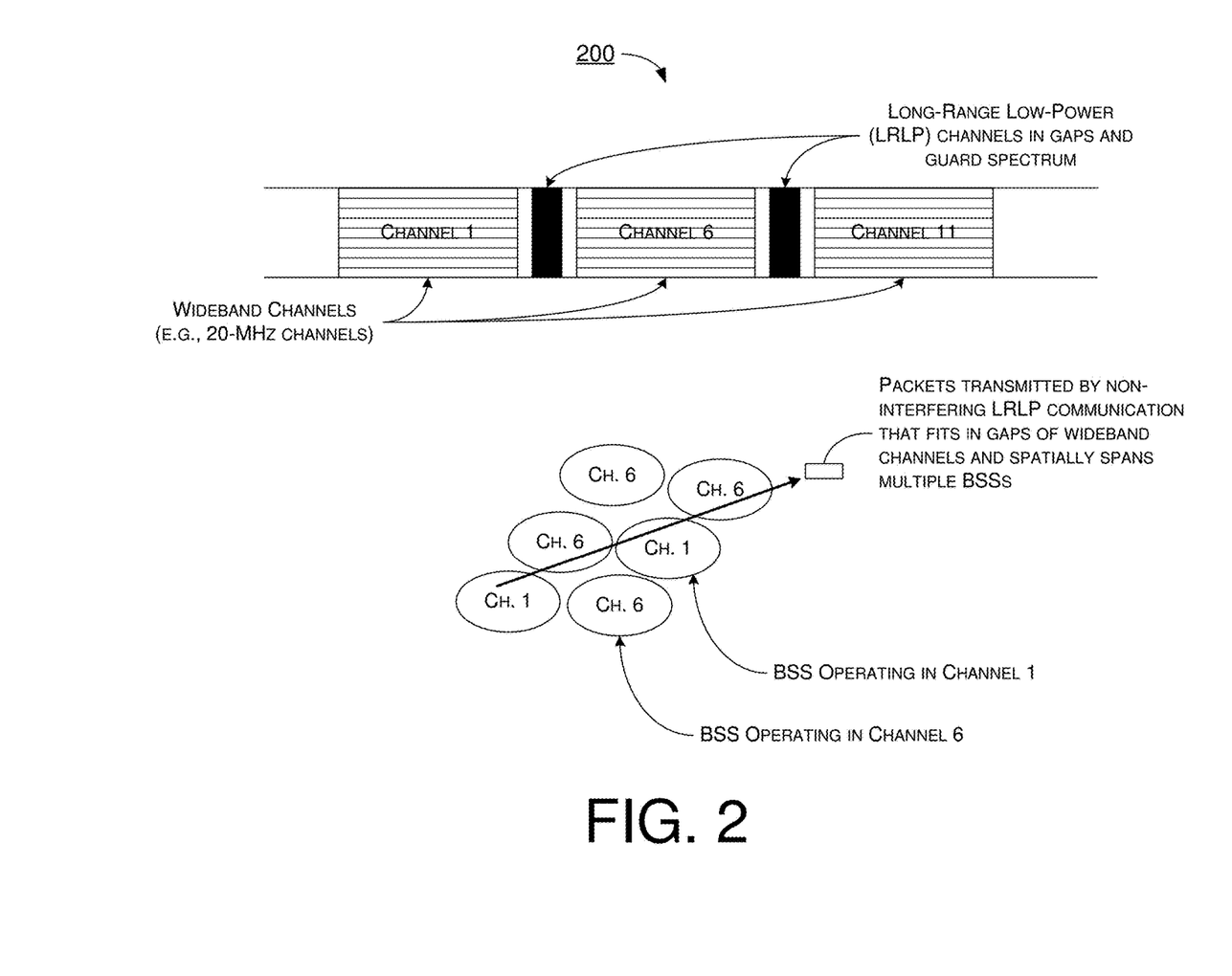
FIG. 2 is a diagram of an example scenario in accordance with an implementation of the present disclosure.

FIG. 2 illustrates an example scenario 200 in accordance with an implementation of the present disclosure. Scenario 200 shows an example of spectrum allocation for LRLP integrated wireless transmission in channel gaps and guard spectrum. In the example shown in FIG. 2, narrowband LRLP transmissions may occur within the gaps between wideband channels (e.g., 20-MHz channel 1, channel 6 and channel 11). This scheme of frequency multiplexing narrowband communications and wideband communications allows simultaneous narrowband LRLP communications and legacy wideband communications without interference. As shown in FIG. 2, data packets transmitted with the narrowband LRLP communications may fit in gaps between wideband channels. Accordingly, with LRLP-supporting BSS and gateways/APs such as LRLP-supporting gateways 110, 120 and 130, the transmission of such data packets may spatially span multiple BSSs.

Figure 3:
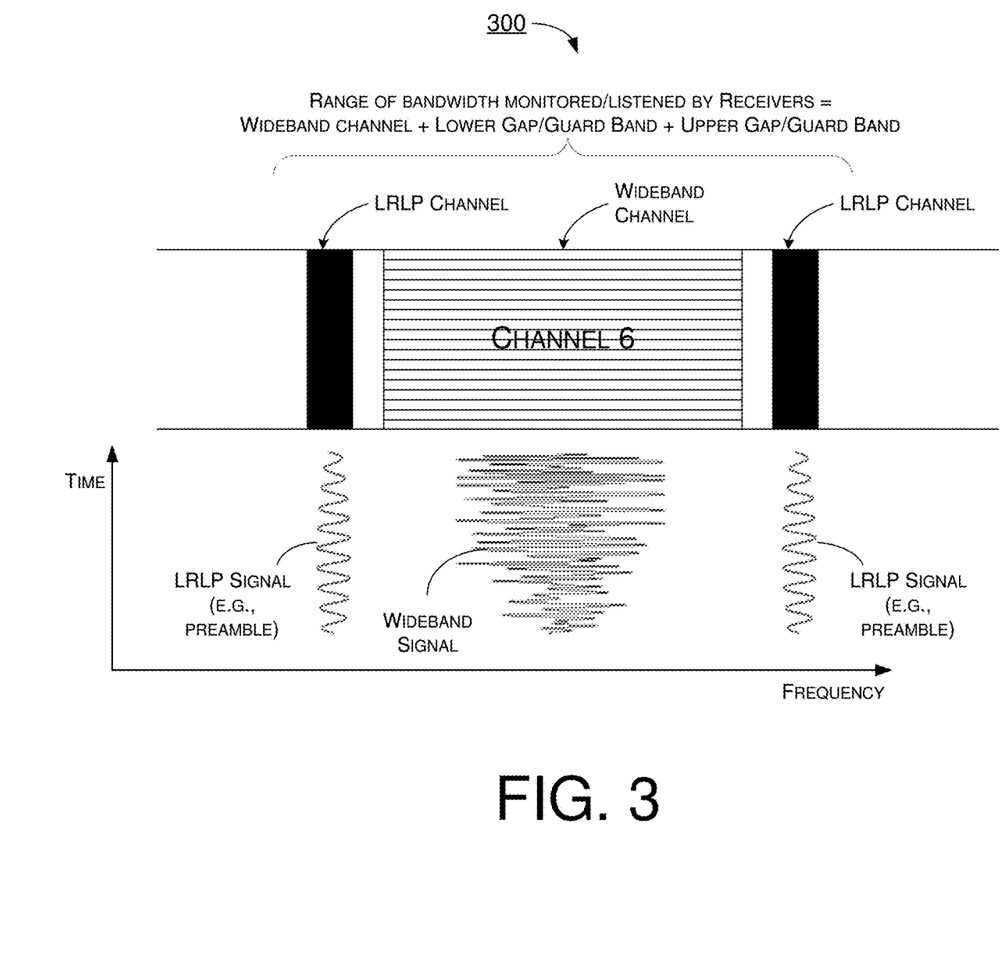
FIG. 3 is a diagram of an example scenario in accordance with an implementation of the present disclosure.

FIG. 3 illustrates an example scenario 300 in accordance with an implementation of the present disclosure. Scenario 300 shows an example of detection of LRLP preambles. Under the proposed scheme, each LRLP-supporting device and each LRLP-supporting gateway/AP may be capable of listening to or otherwise monitoring a range of bandwidth that includes a given wideband channel (e.g., 20 MHz) and a lower gap or guard band as well as an upper gap or guard band on both sides of the given wideband channel. In other words, each LRLP-supporting device and each LRLP-supporting gateway/AP may be capable of listening to or otherwise monitoring a range of bandwidth that is wider than the bandwidth of a wideband channel. In some implementations, each LRLP-supporting device and/or each LRLP-supporting gateway/AP may include a filter that has a slightly wider bandwidth for detecting a bandwidth wider than that of a typical wideband channel. Alternatively or additionally, each LRLP-supporting device and/or each LRLP-supporting gateway/AP may be capable of increasing a sampling rate to detect radio frequency (RF) energy in the wideband channels and the narrowband channels. For instance, by doubling the sampling rate or 2× oversampling (e.g., 40 MHz) of I/Q samples, LRLP preambles in both the lower guard band/gap and the upper guard band/gap may be detectable.

Figure 4:
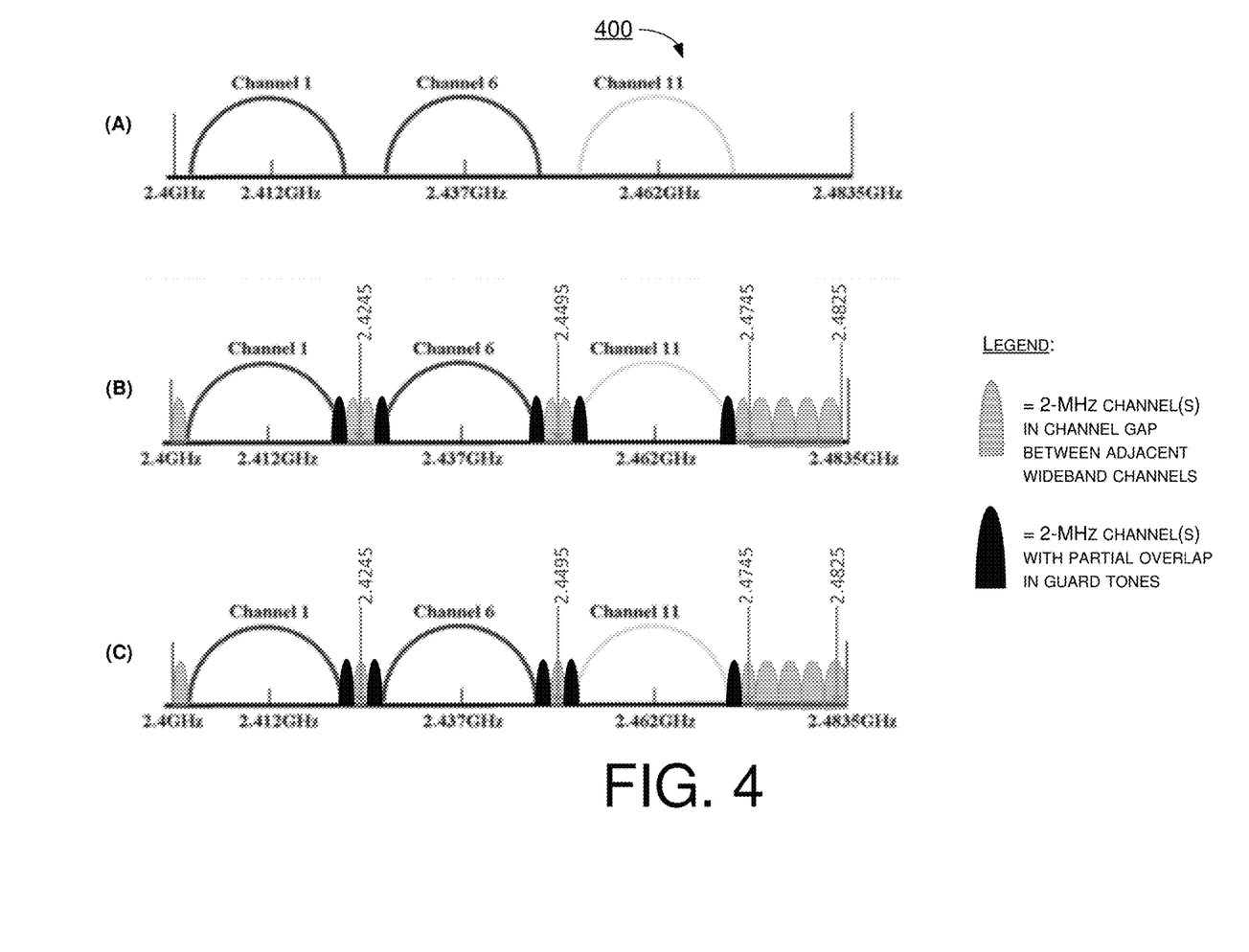
FIG. 4 is a diagram of an example scenario in accordance with an implementation of the present disclosure.

FIG. 4 illustrates an example scenario 400 in accordance with an implementation of the present disclosure. Scenario 400 shows an example implementation of transmitting and receiving LRLP signals in narrowband channels in gaps and guard bands. Part (A) of scenario 400 shows wideband communications in 2.4 GHz. Part (B) of scenario 400 shows a first type of simultaneous wideband communications and narrowband communications. Part (C) of scenario 400 shows a second type of simultaneous wideband communications and narrowband communications. Although the example shown in FIG. 4 is in the context of the 2.4-GHz band, the illustrated channelization plans may be utilized in a similar manner in the 5-GHz band or any band that needs to coexist with LRLP and a wider band OFDM.

As shown in FIG. 4, wideband channel 1 and wideband channel 6 are separated from one another by a 5-MHz gap, and wideband channel 6 and wideband channel 11 are separated from one another by a 5-MHz gap. Additionally, a lower guard band at the lower end of the frequency spectrum separates a lower limit of the frequency spectrum and wideband channel 1, and an upper guard band at the upper end of the frequency spectrum separates an upper limit of the frequency spectrum and wideband channel 11.

Part (B) of scenario 400 shows a first type of channelization for LRLP communications in 2.4 GHz with 2-MHz channels in gaps and guard bands. This may be an aggressive plan of channelization and may work with legacy 52-tone plans with 42 data tones and 4 pilot tones. Under the first type of channelization for LRLP communications, some of the 2-MHz channels in the gaps and guard bands do not overlap with guard tones of the wideband channels while some do overlap in guard tones.

Part (C) of scenario 400 shows a second type of channelization for LRLP communications in 2.4 GHz with 2-MHz channels in gaps and guard bands. This may be a less aggressive plan of channelization and may work with IEEE 802.11n and IEEE 802.11ac plans having 56 tones including 52 data tones and 4 pilot tones. Under the second type of channelization for LRLP communications, some of the 2-MHz channels in the gaps and guard bands do not overlap with guard tones of the wideband channels while some do partially overlap in guard tones.

Referring to parts (B) and (C) of scenario 400, LRLP communications in narrowband channels may occur on a lower end of the frequency spectrum next to channel 1, on a higher end of the frequency spectrum next to channel 11, in the gap between channel 1 and channel 6, in the gap between channel 6 and channel 11, and/or with unused tone(s). The first and second types of channelization as shown in parts (B) and (C) of scenario 400 allow independent non-interfering access for narrowband LRLP communications and wideband (e.g., 20 MHz) communications in channel 1, channel 6 and/or channel 11 of Wi-Fi.

As shown in FIG. 4, for the 2.4-GHz band, there are generally three non-overlapping 20-MHz wideband channels for Wi-Fi, of which about 10% is guard spectrum for guard bands. From about 83.5 MHz of available spectrum, this accounts for 60×90%=54 MHz used for data and pilots, leaving almost 29.5 MHz of channelizable spectrum (e.g., in 1-MHz or 2-MHz OFDM communications).

It is noteworthy that the first type of channelization shown in part (B) of scenario 400 may be compatible with legacy IEEE 802.11a and IEEE 802.11g plans of channel usage in 2.4 GHz. Moreover, the second type of channelization shown in part (C) of scenario 400 may be compatible with IEEE 802.11n and IEEE 802.11ac plans of channel usage in 2.4 GHz. Regardless of the first plan or the second plan, the essence is to use spectrum in the middle of the gap/guard band for LRLP transmissions to achieve efficient use of frequency bands.

Under the proposed scheme, edge tones may be utilized for 20-MHz, 40-MHz or 80-MHz transmissions. Alternatively, OFDM may be utilized for 2-MHz transmissions in frequency duplicate mode (or duplex mode) with identical upper and lower tones. This may provide robustness against transmission when upper or lower BSS is interfering. Referring to FIG. 4, when duplex mode is used, even during wideband transmission in channel 1 or channel 6 in a time slot, impact on LRLP transmissions would be small and the impact may be reduced by 50% on any BSS (e.g., 3 dB less interference energy).

Under the proposed scheme, a LRLP-supporting device and/or LRLP-supporting gateway/AP may first listen to the narrowband channels when LRLP transmission is occurring to detect the energy observed (e.g., −72 dBm) in upper and lower ends of the spectrum or clear channel access (CCA) in the gaps. If a given channel is observed to be quiet then transmission may occur. The detection threshold may be lowered from −62 dBm to −72 dBm as LRLP transmission is long-range transmission.

Under the proposed scheme, matched filter and/or auto-correlator may be utilized in the upper and lower guard tones. Additionally, wideband devices (e.g., 20 MHz) may be able to detect LRLP signals by the same I/Q samples as for Wi-Fi but with different matched filter criteria. In some implementations, LRLP preambles may be utilized, and may be 8 msec or longer. Upon detecting LRLP preamble(s), a device may decide to stay quiet or optionally defer its transmission operation. Additionally, the device detecting the LRLP preamble(s) may decode the preamble and set its NAV to the LRLP duration indicated in the SIG field. As a LRLP preamble pervades across multiple BSSs, this is an effective signaling method to make a large range of BSS quiet, thus avoiding collisions and resolving hidden node issues.

For illustrative purposed and without limitation, simplified mathematics implemented in a detector may involve sampling at a rate f to collect a sample $s_0$, where $s_0 = i_1$, $q_1$, $i_2$, $q_2$, $i_3$, $q_3$, $i_4$, $q_4$ .... By alternating the odd and even terms with different signs, a sample s1 is obtained, where $s_1 = i_1$, $q_1$, $-i_2$, $-q_2$, $i_3$, $q_3$, $-i_4$, $-q_4$ ... and this sequence is circularly shifted by f/2 from a center frequency. By low-pass filtering $s_1$ (e.g., 5× or 10× decimation), energy in the guard bands may be obtained. This can be a simple way to detect LRLP signals for decoding. Optionally, separate filters may be utilized to trigger paths for legacy OFDM and LRLP simultaneously. It is noteworthy that the above example is a simple illustration. Actual implementation may involve a more complex algorithm with oversampled I/Q.

For illustrative purposed and without limitation, simplified mathematics implemented in a transmitter may involve up-sampling a desired signal to 20 MHz with standard techniques of resampling to collect a sample so at a sampling rate f, where $s_0 = i_1$, $q_1$, $i_2$, $q_2$, $i_3$, $q_3$, $i_4$, $q_4$ .... By alternating the odd and even terms with different signs, a sample s1 is obtained, where $s_1 = i_1$, $q_1$, $-i_2$, $-q_2$, $i_3$, $q_3$, $-i_4$, $-q_4$ ... and this sequence is circularly shifted by f/2 from a center frequency. Thus, middle tones may be sent to the edges and the transmitter may transmit $s_1$ at its digital-to-analog converter (DAC). Optionally, sample $s_1$ may be combined with normal OFDM transmission at DAC after equalization of power.

Under the proposed scheme, narrowband (e.g., 2 MHz or 1 MHz) channel operation may be ten times (10×) slowed down in the physical layer (PHY) in LRLP mode. This may be similar to resource unit (RU) in IEEE 802.11ax. Alternatively, 2.5-MHz narrowband channel operation may be eight times (8×) slowed down in PHY in LRLP mode. Alternatively, 1.25-MHz narrowband channel operation may be sixteen times (16×) slowed down in PHY in LRLP mode. Both 1.25 MHz and 2.5 MHz are compatible with existing channelization of 2.4 GHz and 5 GHz, and represent quarter and half channel interval, respectively. Accordingly, an option may be to subdivide 5 MHz into integer fractions to allow LRLP operation to work more seamlessly with standard 5-MHz separated channel plans in the 2.4 GHz band. Non-integer fractions should be avoided to avoid overlap in the frequency domain.

Under the proposed scheme, frequency offsetted communications may be utilized for narrowband LRLP communications on either side or both sides of legacy wideband channel(s). In some implementations, guard tones may also be utilized for LRLP communications. This scheme may be implemented for any OFDM-based communication having guard bands such as, for example and without limitation, Long-Term Evolution (LTE) and Wi-Fi (e.g., IEEE 802.11ah, IEEE 802.11af and any other variants). Moreover, the LRLP communications may be provided on a single carrier or using OFDM.

Under the proposed scheme, channel bonding of LRLP narrowband channels may be allowed, especially for adjacent LRLP narrowband channels. For instance, this may be utilized in a frequency plan for a given geographic location, region or area. The actual plan to be used in a region or area of a neighborhood may be registered in a database of geographic location/frequency plans and/or a spectrum allocation service/master.

Illustrative Implementations

Figure 5:
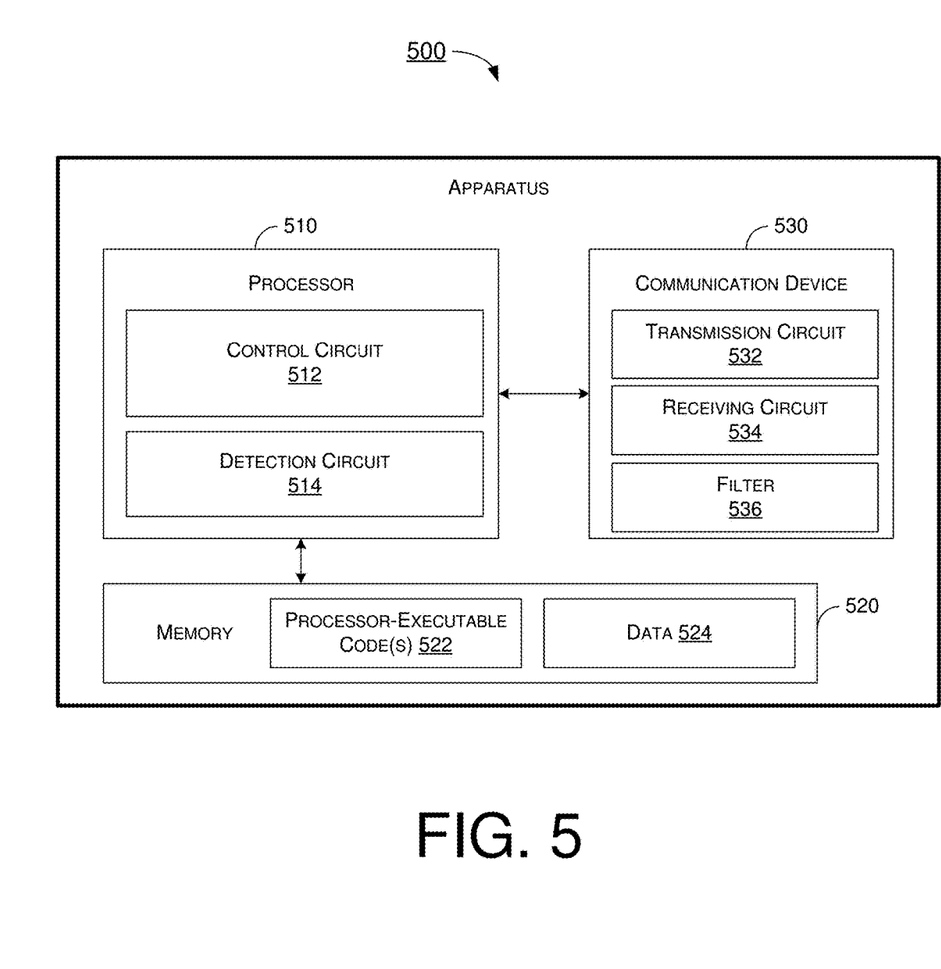
FIG. 5 is a simplified block diagram of an example apparatus in accordance with an implementation of the present disclosure.

FIG. 5 illustrates an example apparatus 500 in accordance with an implementation of the present disclosure. Apparatus 500 may perform various functions to implement schemes, techniques, processes and methods described herein pertaining to LRLP integrated wireless transmission in channel gaps and guard spectrum, including scenario 100, scenario 200, scenario 300 and scenario 400 described above as well as process 600 and process 700 described below. Apparatus 500 may be a part of an electronic apparatus, which may be a wireless communication device, a computing apparatus, a portable or mobile apparatus, or a wearable apparatus. For instance, apparatus 500 may be implemented in or as a Wi-Fi access point, a smartphone, a smartwatch, a smart bracelet, a smart necklace, a personal digital assistant, or a computing device such as a tablet computer, a laptop computer, a notebook computer, a desktop computer, or a server. Alternatively, apparatus 500 may be implemented in the form of one or more integrated-circuit (IC) chips such as, for example and not limited to, one or more single-core processors, one or more multi-core processors, or one or more complex-instruction-set-computing (CISC) processors. Apparatus 500 may be implemented as a LRLP access point/gateway or a LRLP device in accordance with the present disclosure. Apparatus 500 may include one or more of the components shown in FIG. 5, such as a processor 510, a memory 520 and a communication device 530.

Memory 520 may be a storage device configured to store one or more sets of processor-executable codes, programs and/or instructions 522 as well as data 524 therein. For example, memory 520 may be operatively coupled to processor 510 to receive data 524. Memory 520 may be implemented by any suitable technology and may include volatile memory and/or non-volatile memory. For example, memory 520 may include a type of random access memory (RAM) such as dynamic RAM (DRAM), static RAM (SRAM), thyristor RAM (T-RAM) and/or zero-capacitor RAM (Z-RAM). Alternatively or additionally, memory 520 may include a type of read-only memory (ROM) such as mask ROM, programmable ROM (PROM), erasable programmable ROM (EPROM) and/or electrically erasable programmable ROM (EEPROM). Alternatively or additionally, memory 520 may include a type of non-volatile random-access memory (NVRAM) such as flash memory, solid-state memory, ferroelectric RAM (FeRAM), magnetoresistive RAM (MRAM) and/or phase-change memory.

Communication device 530 may include a transmission circuit 532, a receiving circuit 534 and a filter 536. Transmission circuit 532 may be configured to transmit data wirelessly in compliance with the IEEE 802.11 specification and/or any applicable wireless protocols and standards. Receiving circuit 534 may be configured to receive data wirelessly in compliance with the IEEE 802.11 specification and/or any applicable wireless protocols and standards. Filter 536 may be configured to filter incoming wireless signals with a bandwidth greater than a bandwidth of a given wideband channel. For instance, when the bandwidth of a given wideband channel is 20 MHz, filter 536 may be capable of filtering a bandwidth greater than 20 MHz (e.g., 25 MHz or 30 MHz) with additional spectrum on either or both sides of the wideband channel.

Processor 510 may be implemented in the form of one or more single-core processors, one or more multi-core processors, or one or more CISC processors. That is, processor 510 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, processor 510 is a special-purpose machine specifically designed, built and configured to perform specific tasks pertaining to LRLP integrated wireless transmission in channel gaps and guard spectrum in accordance with the present disclosure.

Processor 510 may be operably coupled to memory 520 and communication device 530. Processor 510 may access memory 520 to execute the one or more processor-executable codes 522 stored in memory 520. Upon executing the one or more processor-executable codes 522, processor 510 may be configured to perform operations pertaining to LRLP integrated wireless transmission in channel gaps and guard spectrum in accordance with the present disclosure. Alternatively, processor 510 may include special-purpose circuitry, such as a control circuit 512 and a detection circuit 514, designed, configured or otherwise arranged to perform operations pertaining to LRLP integrated wireless transmission in channel gaps and guard spectrum in accordance with the present disclosure.

In some implementations, control circuit 512 may facilitate, via communication device 530, wideband wireless communications in at least one wideband channel with guard tones in a frequency spectrum. Control circuit 512 may also facilitate, via communication device 530, narrowband wireless communications, while facilitating the wideband wireless communications, in one or more narrowband channels on either or both sides of the at least one wideband channel in the frequency spectrum.

In some implementations, in facilitating the wideband wireless communications, control circuit 512 may be capable of facilitating frequency-division multiplexing (OFDM)-based wireless communications. Moreover, in facilitating the narrowband wireless communications, control circuit 512 may be capable of facilitating LRLP wireless communications on a single carrier or using OFDM.

In some implementations, in facilitating the narrowband wireless communications, control circuit 512 may be capable of facilitating LRLP wireless communications by frequency duplexing LRLP signals at an upper end and a lower end of a spectrum of the at least one wideband channel.

In some implementations, in facilitating the wideband wireless communications, control circuit 512 may be capable of facilitating the wideband wireless communications in a plurality of wideband channels in the frequency spectrum. Furthermore, in facilitating the narrowband wireless communications in the one or more narrowband channels, control circuit 512 may be capable of facilitating LRLP wireless communications in a plurality of narrow band channels in one or more channel gaps between the wideband channels.

In some implementations, in facilitating the narrowband wireless communications, while facilitating the wideband wireless communications, processor 510 may be capable of performing a number of operations. For instance, detection circuit 514 may be capable of detecting, while in a listening mode for the wideband wireless communications, one or more LRLP signals, one or more LRLP preambles, or both, indicative of the narrowband wireless communications. Moreover, control circuit 512 may be capable of performing one of the following operations: (1) ignoring a result of the detecting; (2) preempting reception of wideband signals for the wideband wireless communications; or (3) receiving signals for the wideband wireless communications while receiving signals for the narrowband wireless communications.

In some implementations, in detecting, detection circuit 514 may be capable of receiving the one or more LRLP signals, one or more LRLP preambles, or both, using a filter with a bandwidth greater than a bandwidth of each of the wideband channels. Alternatively or additionally, in detecting, detection circuit 514 may be capable of increasing a sampling rate to detect radio frequency (RF) energy in the wideband channels and the narrowband channels.

In some implementations, processor 510 may be further capable of performing at least one of a plurality of operations. For instance, control circuit 512 may be capable of channel bonding two adjacent narrowband channels of the one or more narrowband channels in a frequency plan for a given geographic location. Alternatively or additionally, control circuit 512 may be capable of communicating with one or more access points (APs) to transmit and receive AP coordination information in at least one of the one or more narrowband channels. Moreover, control circuit 512 may be capable of synchronizing with the one or more access points using the AP coordination information.

In some implementations, in facilitating the wideband wireless communications in the plurality of wideband channels, control circuit 512 may be capable of facilitating Wi-Fi communications in multiple 20-MHz channels in 2.4 GHz or 5 GHz using channel 1, channel 6, channel 11, or a combination thereof in accordance with the IEEE 802.11 specifications. In some implementations, in facilitating the narrowband wireless communications in the plurality of narrowband channels, control circuit 512 may be capable of facilitating LRLP wireless communications in multiple 2-MHz channels in the channel gaps, the guard bands, or both.

In some implementations, each of the wideband channels may include a respective lower guard tone at a lower end thereof and a respective upper guard tone at an upper end thereof. In some implementations, at least one of the narrow bands may overlap with the respective lower guard tone or the respective upper guard tone of one of the wideband channels.

In some implementations, detection circuit 514 may detect, via communication device 530, LRLP signals and/or preambles seamlessly while in a listening mode for wideband (e.g., 20 MHz) communications. Moreover, while receiving data in a wideband channel, detection circuit 514 may detect, via communication device 530, LRLP signals/preambles adjacent to the wideband channel. For instance, when a LRLP signal or preamble is detected while receiving circuit 534 is active for 20-MHz OFDM, control circuit 512 may be capable of performing one of the following operations: (1) ignoring the detected LRLP signal or preamble; (2) preempting reception of wideband signals for the wideband wireless communications; or (3) receiving signals for the wideband wireless communications while receiving signals for the narrowband wireless communications.

In some implementations, filter 536 may be designed, configured or otherwise arranged with increased bandwidth sufficient to cover one or more LRLP channels adjacent to a given wideband channel. Alternatively or additionally, a sampling rate of receiving circuit 534 may be increased (e.g., to 50 MHz, 60 MHz or higher) to detect energy at the lower and upper ends of the LRLP spectrum. Thus, under the proposed scheme, LRLP signals in the guard bands and 20 MHz preambles may be detected simultaneously. This is a novel use of the spectrum and a hybrid receiver (e.g., receiver 534).

Figure 6:
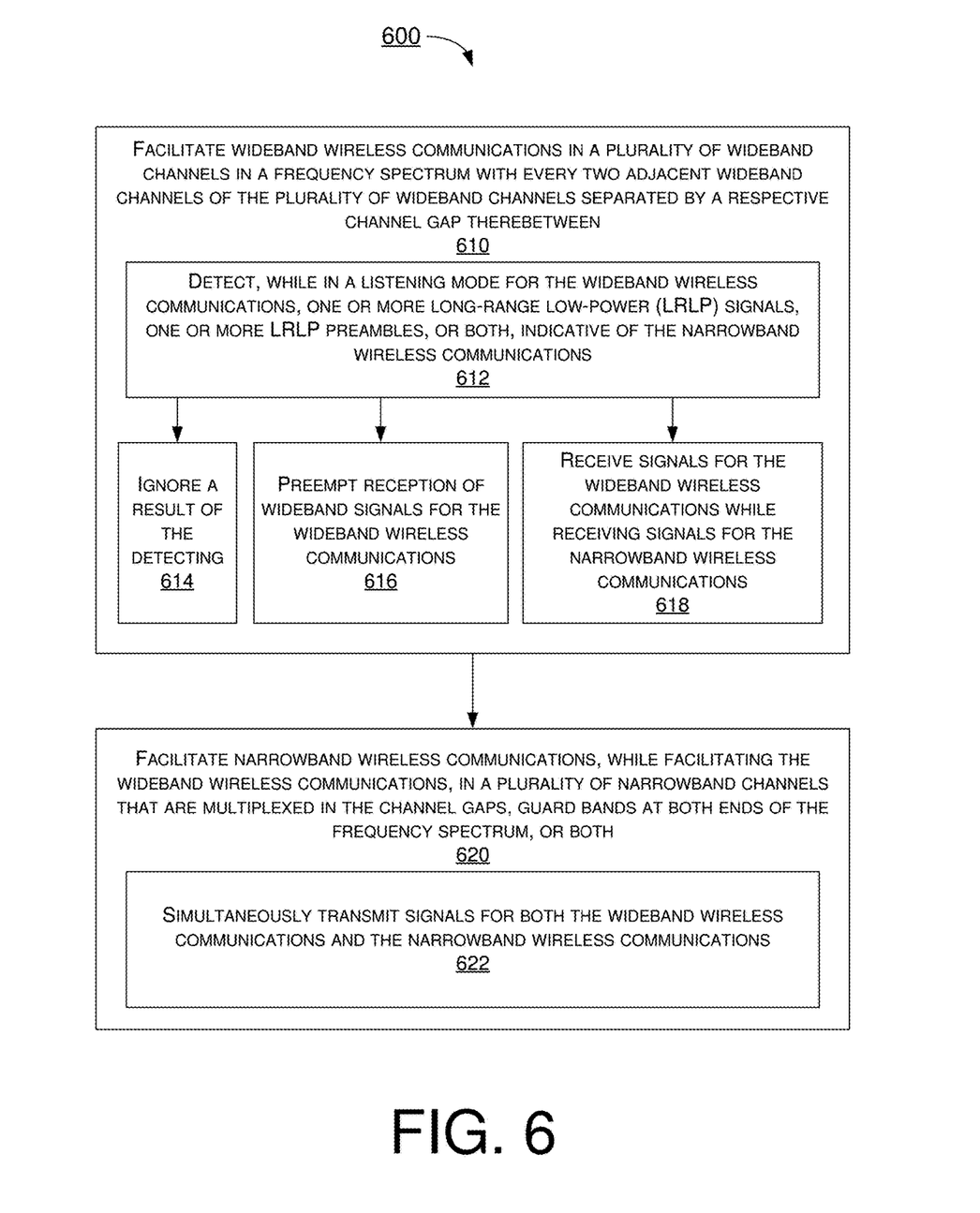
FIG. 6 is a flowchart of an example process in accordance with an implementation of the present disclosure.

FIG. 6 illustrates an example process 600 in accordance with an implementation of the present disclosure. Process 600 may be an example implementation of scenario 100, scenario 200, scenario 300 and/or scenario 400, whether partially or completely, with respect to LRLP integrated wireless transmission in channel gaps and guard spectrum. Process 600 may represent an aspect of implementation of features of apparatus 500. Process 600 may include one or more operations, actions, or functions as illustrated by one or more of blocks 610 and 620 as well as sub-blocks 612, 614, 616, 618 and 622. Although illustrated as discrete blocks, various blocks of process 600 may be divided into additional blocks, combined into fewer blocks, or eliminated, depending on the desired implementation. Moreover, the blocks of process 600 may executed in the order shown in FIG. 6 or, alternatively in a different order. Process 600 may be implemented by apparatus 500 and any variations and/or derivatives thereof. Solely for illustrative purposes, process 600 is described below in the context of apparatus 500. Process 600 may begin at block 610.

At 610, process 600 may involve processor 510 of apparatus 500 facilitating, via communication device 530, wideband wireless communications in a plurality of wideband channels in a frequency spectrum with every two adjacent wideband channels of the plurality of wideband channels separated by a respective channel gap therebetween. Process 600 may proceed from 610 to 620.

At 620, process 600 may involve processor 510 of apparatus 500 facilitating, via communication device 530, narrowband wireless communications, while facilitating the wideband wireless communications, in a plurality of narrowband channels that are multiplexed in the channel gaps, guard bands at both ends of the frequency spectrum, or both.

In some implementations, in facilitating the wideband wireless communications in the plurality of wideband channels, process 600 may involve processor 510 a number of operations as depicted in sub-blocks 612, 614, 616 and 618.

At 612, process 600 may involve processor 510 detecting, while in a listening mode for the wideband wireless communications, one or more LRLP signals, one or more LRLP preambles, or both, that may be indicative of the narrowband wireless communications. In some implementations, in detecting the one or more LRLP signals, one or more LRLP preambles, or both, process 600 may involve processor 510 receiving, via communication device 520, the one or more LRLP signals, one or more LRLP preambles, or both, using a filter (e.g., filter 536) with a bandwidth greater than a bandwidth of each of the wideband channels. Additionally or alternatively, in detecting the one or more LRLP signals, one or more LRLP preambles, or both, process 600 may involve processor 510 increasing a sampling rate to detect RF energy in the wideband channels and the narrowband channels. Process 600 may proceed from 612 to 614, 616 or 618.

At 614, process 600 may involve processor 510 ignoring a result of the detecting.

At 616, process 600 may involve processor 510 preempting reception of wideband signals for the wideband wireless communications.

At 618, process 600 may involve processor 510 receiving signals for the wideband wireless communications while receiving signals for the narrowband wireless communications.

In some implementations, in facilitating the narrowband wireless communications, while facilitating the wideband wireless communications, in the plurality of wideband channels, process 600 may involve processor 510 a number of operations as depicted in sub-block 622. At 622, process 600 may involve processor 510 simultaneously transmitting, via communication device 530, signals for both the wideband wireless communications and the narrowband wireless communications. In some implementations, in simultaneously transmitting signals for both the wideband wireless communications and the narrowband wireless communications, process 600 may involve processor 510 receiving for the narrowband wireless communications while transmitting for the wideband wireless communications. Alternatively or additionally, in simultaneously transmitting signals for both the wideband wireless communications and the narrowband wireless communications, process 600 may involve processor 510 transmitting for the narrowband wireless communications while receiving for the wideband wireless communications.

In some implementations, in facilitating the wideband wireless communications in the plurality of wideband channels, process 600 may involve processor 510 facilitating Wi-Fi communications in multiple 20-MHz channels in 2.4 GHz or 5 GHz using channel 1, channel 6, channel 11, or a combination thereof in accordance with the IEEE 802.11 specifications. In some implementations, in facilitating the narrowband wireless communications in the plurality of narrowband channels, process 600 may involve processor 510 facilitating LRLP wireless communications in multiple 2-MHz channels in the channel gaps, the guard bands, or both.

In some implementations, each of the wideband channels may include a respective lower guard tone at a lower end thereof and a respective upper guard tone at an upper end thereof. In such cases, at least one of the narrow bands may overlap with the respective lower guard tone or the respective upper guard tone of one of the wideband channels.

Figure 7:
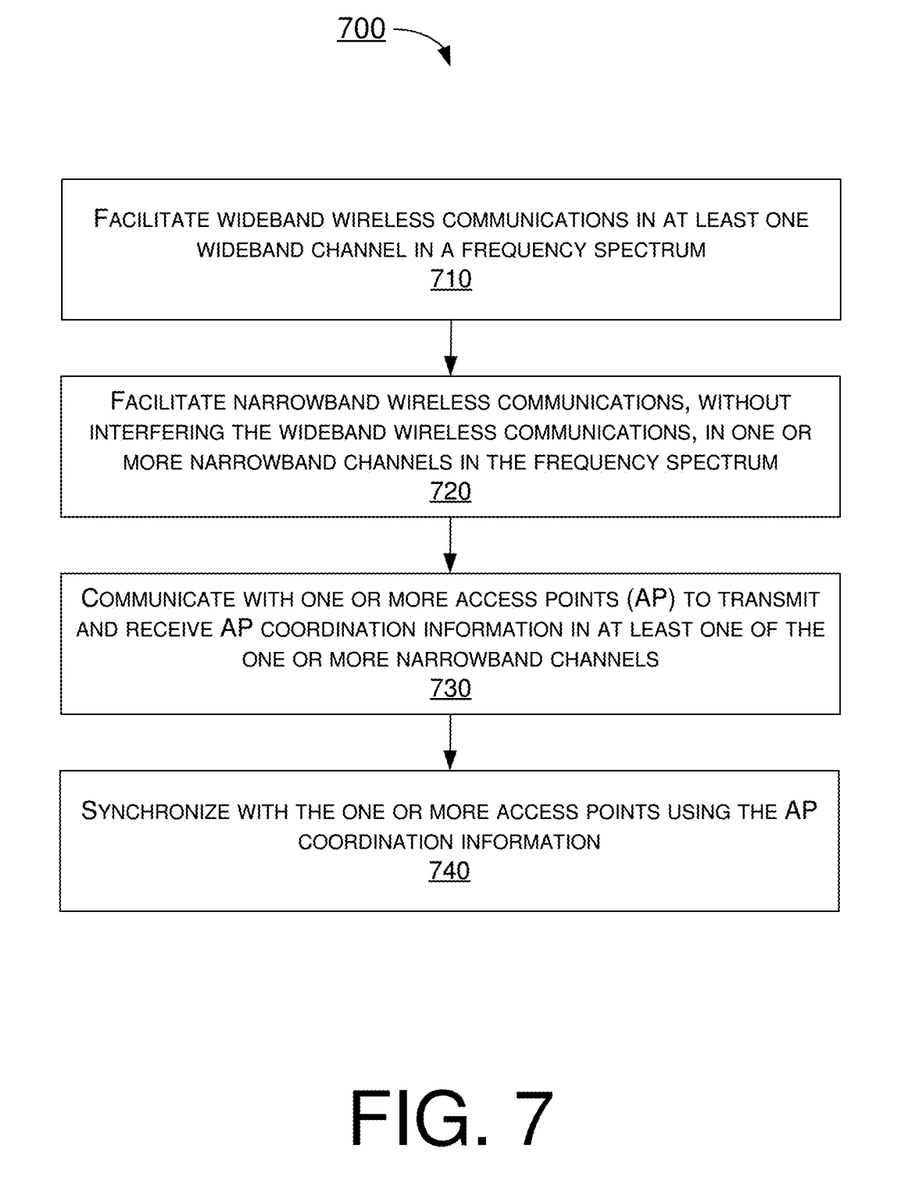
FIG. 7 is a flowchart of an example process in accordance with another implementation of the present disclosure.

FIG. 7 illustrates an example process 700 in accordance with an implementation of the present disclosure. Process 700 may be an example implementation of scenario 100, scenario 200, scenario 300 and/or scenario 400, whether partially or completely, with respect to LRLP integrated wireless transmission in channel gaps and guard spectrum. Process 700 may represent an aspect of implementation of features of apparatus 500. Process 700 may include one or more operations, actions, or functions as illustrated by one or more of blocks 710, 720, 730 and 740. Although illustrated as discrete blocks, various blocks of process 700 may be divided into additional blocks, combined into fewer blocks, or eliminated, depending on the desired implementation. Moreover, the blocks of process 700 may executed in the order shown in FIG. 7 or, alternatively in a different order. Process 700 may be implemented by apparatus 500 and any variations and/or derivatives thereof. Solely for illustrative purposes, process 700 is described below in the context of apparatus 500. Process 700 may begin at block 710.

At 710, process 700 may involve processor 510 of apparatus 500 facilitating, via communication device 530, wideband wireless communications in at least one wideband channel in a frequency spectrum. Process 700 may proceed from 710 to 720.

At 720, process 700 may involve processor 510 of apparatus 500 facilitating, via communication device 530, narrowband wireless communications, without interfering the wideband wireless communications, in one or more narrowband channels in the frequency spectrum. Process 700 may stop at 720. Optionally, process 700 may proceed from 720 to 730.

At 730, process 700 may involve processor 510 of apparatus 500 communicating, via communication device 530, with one or more access points (APs) to transmit and receive AP coordination information in at least one of the one or more narrowband channels. Process 700 may proceed from 730 to 740.

At 740, process 700 may involve processor 510 of apparatus 500 synchronizing, via communication device 530, with the one or more access points using the AP coordination information.

In some implementations, in facilitating the wideband wireless communications in the at least one wideband channel in the frequency spectrum, process 700 may involve processor 510 facilitating the wideband wireless communications in the at least one wideband channel with guard tones in the frequency spectrum. Additionally, in facilitating the narrowband wireless communications, without interfering the wideband wireless communications, in the one or more narrowband channels in the frequency spectrum, process 700 may involve processor 510 facilitating the narrowband wireless communications, while facilitating the wideband wireless communications, in the one or more narrowband channels on either or both sides of the at least one wideband channel in the frequency spectrum.

In some implementations, in facilitating the wideband wireless communications, process 700 may involve processor 510 facilitating orthogonal frequency-division multiplexing (OFDM)-based wireless communications. Moreover, in facilitating the narrowband wireless communications, process 700 may involve processor 510 facilitating LRLP wireless communications on a single carrier or using OFDM.

In some implementations, in facilitating the narrowband wireless communications, process 700 may involve processor 510 facilitating LRLP wireless communications by frequency duplexing LRLP signals at an upper end and a lower end of a spectrum of the at least one wideband channel.

In some implementations, in facilitating the wideband wireless communications in the at least one wideband channel in the frequency spectrum, process 700 may involve processor 510 facilitating the wideband wireless communications in a plurality of wideband channels in the frequency spectrum. Additionally, in facilitating the narrowband wireless communications in the one or more narrowband channels, process 700 may involve processor 510 facilitating LRLP wireless communications in a plurality of narrow band channels in one or more channel gaps between the wideband channels.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
    facilitating wideband wireless communications in a plurality of wideband channels in a frequency spectrum with every two adjacent wideband channels of the plurality of wideband channels separated by a respective channel gap therebetween; and
    facilitating narrowband wireless communications, while facilitating the wideband wireless communications, in a plurality of narrowband channels that are multiplexed in the channel gaps, guard bands at both ends of the frequency spectrum, or both,
    wherein the facilitating of the wideband wireless communications in the plurality of wideband channels comprises facilitating Wi-Fi communications in multiple 20-MHz channels in 2.4 GHz or 5 GHz using channel 1, channel 6, channel 11, or a combination thereof in accordance with Institute of Electrical and Electronic Engineers (IEEE) 802.11 specifications, and
    wherein the facilitating of the narrowband wireless communications in the plurality of narrowband channels comprises facilitating long-range low-power (LRLP) wireless communications in multiple 2-MHz channels in the channel gaps, the guard bands, or both.

2. The method of claim 1, wherein each of the wideband channels comprises a respective lower guard tone at a lower end thereof and a respective upper guard tone at an upper end thereof, and wherein at least one of the narrow bands overlaps with the respective lower guard tone or the respective upper guard tone of one of the wideband channels.

3. The method of claim 1, wherein the facilitating of the narrowband wireless communications, while facilitating the wideband wireless communications, comprises:
    detecting, while in a listening mode for the wideband wireless communications, one or more long-range low-power (LRLP) signals, one or more LRLP preambles, or both, indicative of the narrowband wireless communications; and
    performing one of:
        ignoring a result of the detecting;
        preempting reception of wideband signals for the wideband wireless communications; or
        receiving signals for the wideband wireless communications while receiving signals for the narrowband wireless communications.

4. The method of claim 3, wherein the detecting comprises performing either or both of:
    receiving the one or more LRLP signals, one or more LRLP preambles, or both, using a filter with a bandwidth greater than a bandwidth of each of the wideband channels; and
    increasing a sampling rate to detect radio frequency (RF) energy in the wideband channels and the narrowband channels.

5. The method of claim 1, wherein the facilitating of the narrowband wireless communications, while facilitating the wideband wireless communications, comprises:

simultaneously transmitting signals for both the wideband wireless communications and the narrowband wireless communications, wherein the transmitting comprises one of:
    receiving for the narrowband wireless communications while transmitting for the wideband wireless communications; or
    transmitting for the narrowband wireless communications while receiving for the wideband wireless communications.

6. A method, comprising:
facilitating wideband wireless communications in at least one wideband channel in a frequency spectrum; and
facilitating narrowband wireless communications, without interfering the wideband wireless communications, in one or more narrowband channels in the frequency spectrum,
wherein the facilitating of the narrowband wireless communications, without interfering the wideband wireless communications, comprises:
    detecting, while in a listening mode for the wideband wireless communications, one or more long-range low-power (LRLP) signals, one or more LRLP preambles, or both, indicative of the narrowband wireless communications; and
    performing one of:
        ignoring a result of the detecting;
        preempting reception of wideband signals for the wideband wireless communications; or
        receiving signals for the wideband wireless communications while receiving signals for the narrowband wireless communications.

7. The method of claim 6, wherein:
the facilitating of the wideband wireless communications in the at least one wideband channel in the frequency spectrum comprises facilitating the wideband wireless communications in the at least one wideband channel with guard tones in the frequency spectrum, and
the facilitating of the narrowband wireless communications, without interfering the wideband wireless communications, in the one or more narrowband channels in the frequency spectrum comprises facilitating the narrowband wireless communications, while facilitating the wideband wireless communications, in the one or more narrowband channels on either or both sides of the at least one wideband channel in the frequency spectrum.

8. The method of claim 6, wherein:
the facilitating of the wideband wireless communications comprises facilitating orthogonal frequency-division multiplexing (OFDM)-based wireless communications, and
the facilitating of the narrowband wireless communications comprises facilitating LRLP wireless communications on a single carrier or using OFDM.

9. The method of claim 6, wherein the facilitating of the narrowband wireless communications comprises facilitating LRLP wireless communications by frequency duplexing LRLP signals at an upper end and a lower end of a spectrum of the at least one wideband channel.

10. The method of claim 6, wherein:
the facilitating of the wideband wireless communications in the at least one wideband channel in the frequency spectrum comprises facilitating the wideband wireless communications in a plurality of wideband channels in the frequency spectrum, and the facilitating of the narrowband wireless communications in the one or more narrowband channels comprises facilitating LRLP wireless communications in a plurality of narrow band channels in one or more channel gaps between the wideband channels.

11. The method of claim 6, further comprising:
communicating with one or more access points (AP) to transmit and receive AP coordination information in at least one of the one or more narrowband channels; and
synchronizing with the one or more access points using the AP coordination information.

12. An apparatus, comprising:
a communication device capable of transmitting and receiving wireless signals; and
a processor operatively coupled to the communication device and capable of performing operations comprising:
    facilitating, via the communication device, wideband wireless communications in at least one wideband channel with guard tones in a frequency spectrum; and
    facilitating, via the communication device, narrowband wireless communications, while facilitating the wideband wireless communications, in one or more narrowband channels on either or both sides of the at least one wideband channel in the frequency spectrum,
wherein, in facilitating the narrowband wireless communications, while facilitating the wideband wireless communications, the processor is capable of performing operations comprising:
    detecting, while in a listening mode for the wideband wireless communications, one or more long-range low-power (LRLP) signals, one or more LRLP preambles, or both, indicative of the narrowband wireless communications; and
    performing one of:
        ignoring a result of the detecting;
        preempting reception of wideband signals for the wideband wireless communications; or
        receiving signals for the wideband wireless communications while receiving signals for the narrowband wireless communications.

13. The apparatus of claim 12, wherein, in facilitating the wideband wireless communications, the processor is capable of facilitating frequency-division multiplexing (OFDM)-based wireless communications, and wherein, in facilitating the narrowband wireless communications, the processor is capable of facilitating long-range low-power (LRLP) wireless communications on a single carrier or using OFDM.

14. The apparatus of claim 12, wherein, in facilitating the narrowband wireless communications, the processor is capable of facilitating long-range low-power (LRLP) wireless communications by frequency duplexing LRLP signals at an upper end and a lower end of a spectrum of the at least one wideband channel.

15. The apparatus of claim 12, wherein, in facilitating the wideband wireless communications, the processor is capable of facilitating the wideband wireless communications in a plurality of wideband channels in the frequency spectrum, and wherein, in facilitating the narrowband wireless communications in the one or more narrowband channels, the processor is capable of facilitating long-range low-power (LRLP) wireless communications in a plurality of narrow band channels in one or more channel gaps between the wideband channels.

16. The apparatus of claim 12, wherein, in detecting, the processor is capable of performing either or both of:
- receiving the one or more LRLP signals, one or more LRLP preambles, or both, using a filter with a bandwidth greater than a bandwidth of each of the wideband channels; and
- increasing a sampling rate to detect radio frequency (RF) energy in the wideband channels and the narrowband channels.

17. The apparatus of claim 12, wherein the processor is further capable of performing at least one of a plurality of operations comprising:
- channel bonding two adjacent narrowband channels of the one or more narrowband channels in a frequency plan for a given geographic location;
- communicating with one or more access points (AP) to transmit and receive AP coordination information in at least one of the one or more narrowband channels; and
- synchronizing with the one or more access points using the AP coordination information.

\* \* \* \* \*